United States Patent [19]
Trayner et al.

[11] Patent Number: 6,095,652
[45] Date of Patent: Aug. 1, 2000

[54] PROJECTION SYSTEM

[75] Inventors: David John Trayner; Edwina Margaret Orr, both of London, United Kingdom

[73] Assignee: Richmond Holographic Research and Development, Ltd., London, United Kingdom

[21] Appl. No.: 09/043,241

[22] PCT Filed: Sep. 15, 1995

[86] PCT No.: PCT/GB95/02184

§ 371 Date: Jun. 12, 1998

§ 102(e) Date: Jun. 12, 1998

[87] PCT Pub. No.: WO97/10523

PCT Pub. Date: Mar. 20, 1997

[51] Int. Cl.$^7$ ................................................. G03B 21/14
[52] U.S. Cl. ................................ 353/10; 353/79; 359/15; 359/33; 359/446
[58] Field of Search .................................. 353/7, 10, 79, 353/94, 97, 122; 359/32.15, 33, 34, 446, 448, 445, 460, 478

[56] References Cited

U.S. PATENT DOCUMENTS

| 4,799,739 | 1/1989 | Newswanger . | |
|---|---|---|---|
| 4,993,790 | 2/1991 | Vick . | |
| 5,198,895 | 3/1993 | Vick | 358/103 |
| 5,717,522 | 2/1998 | Hattori et al. | 359/465 |
| 5,760,955 | 6/1998 | Goldenberg et al. | 359/456 |
| 5,796,499 | 8/1998 | Wenyon | 359/15 |
| 5,798,866 | 8/1998 | CeVaan | 359/621 |
| 5,828,471 | 10/1998 | Davis et al. | 359/15 |
| 5,868,480 | 2/1999 | Zeinali | 353/31 |
| 5,943,166 | 8/1999 | Hoshi et al. | 359/475 |

FOREIGN PATENT DOCUMENTS

| 349 884 A2 | 6/1989 | European Pat. Off. . |
| 349 947 A2 | 7/1989 | European Pat. Off. . |
| 2 287 554 | 3/1994 | United Kingdom . |

*Primary Examiner*—William Dowling
*Attorney, Agent, or Firm*—Blank Rome Comisky & McCauley

[57] ABSTRACT

A projection system incorporating a screen (2, 14) with a substantially achromatic response in a direction substantially perpendicular to the plane of the screen. The screen (2, 14) comprises a diffraction grating (4), means (5) for attenuating zero order and a diffuse holographic optical element (6). The system further comprises a focusing element with positive optical power. The aggregate optical power of the grating and the holographic optical element is substantially less than that of the focusing element.

19 Claims, 3 Drawing Sheets

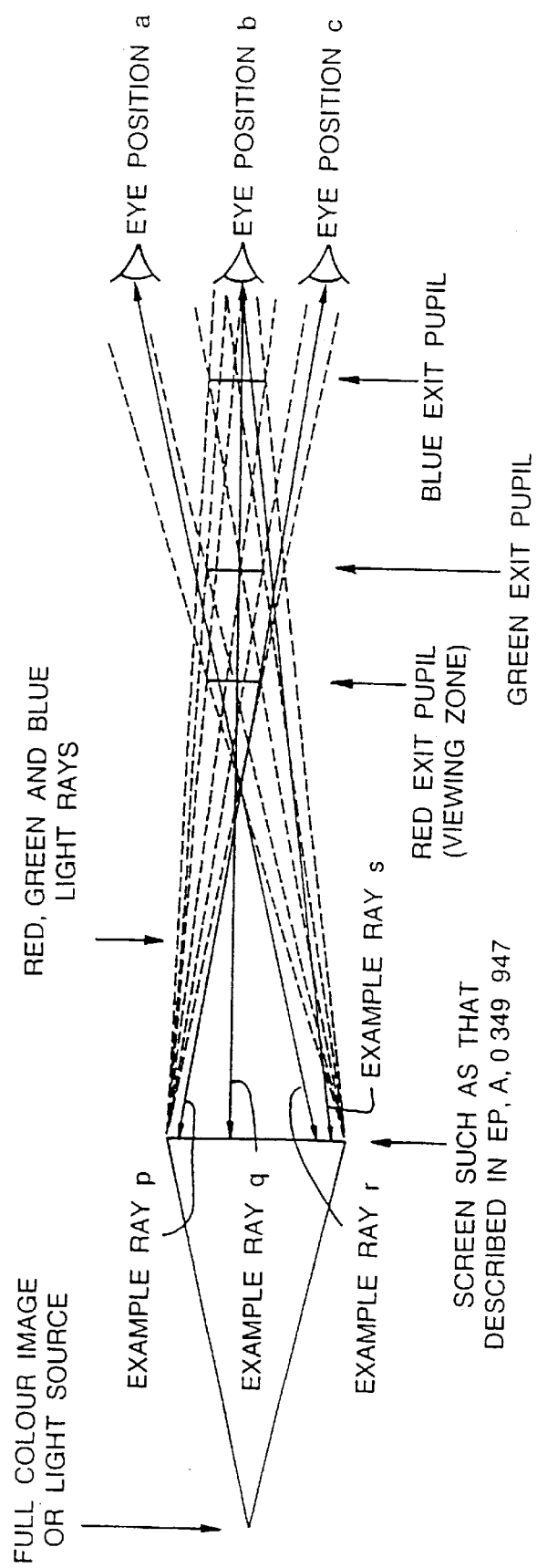
Fig.1. (PLAN VIEW) PRIOR ART
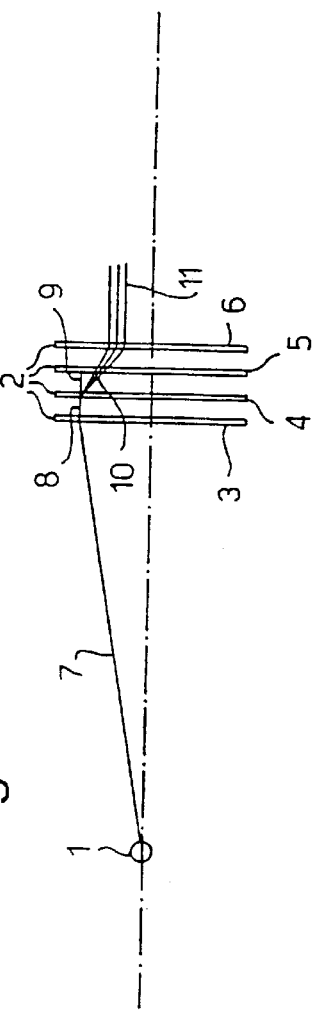
Fig.2.

PROJECTION SYSTEM

This invention relates to a projection system where the screen uses holographic optical elements.

In U.S. Pat. No. 4,799,739 there is disclosed apparatus for autostereoscopic display in which images are projected onto a screen comprising a diffused holographic optical element.

However, a disadvantage of such apparatus is that it is necessary to project the image at an angle of incidence in the range of 60 to 30 degrees to an axis normal to the screen, the normal axis extending at 90 degrees to a plane containing the screen. Such off-axis projection produces image distortions which are difficult to compensate for in any practical system.

In U.S. Pat. No. 4,799,739 there exist additional problems in obtaining a good colour response from the screen over a range of viewing positions.

It would be an advantage if a screen could be made which allows normal or near normal image projection with good colour response over a wide range of viewing positions. (The normal is a line perpendicular to the plane of the screen). Part of one possible approach is outlined in EP-A-0349947 and WO-A-840615. These inventions can produce a screen which allows normal image projection and on axis viewing with an achromatic response.

In certain applications, however, EP-A-0349947 and WO-A-840615 suffer from the intrinsic problem in that, although they allow achromatic on axis viewing, the viewing zones (also known as exit pupils) for every wavelength of the incident light form at different distances from the screen (this is illustrated well in FIG. 1. of EP-A-0 349947). This is not a problem in the case of on-axis viewing, in other cases—e.g. in autostereoscopic applications or where the viewing zone needs to be small it can be a severe problem as illustrated in plan view in our FIG. 1.

Referring to FIG. 1 (which closely resembles FIG. 1 in EP-A-0349947) it may be seen that a viewing zone for every different wavelength of the incident light forms at a different distances from the screen. In the illustrated case the viewing zones are quite narrow which means that an eye at position a will see just part of the screen through the red zone—as indicated by the ray r as the other colours are absent this will be perceived a red band to the left side of the screen. An eye at position b will observe a variety of colours—the line indicated by ray q passes through all the viewing zones so that part of the screen will appear white, ray s passes through the blue zone only so that side of the screen will appear blue. From eye position c. the screen will appear with a red band at the right as may be seen by considering ray p.

It is apparent that in certain applications (such as autostereoscopic viewing) the fact that the viewing zones of all relevant wavelengths are not completely registered one with another will pose great problems by introducing bad colour fringing.

According to the present invention, there is provided a projection system comprising a screen, the screen comprising a diffraction grating, means for attenuating zero order light, and a diffuse holographic optical element characterised in that the system further comprises a focusing system element with positive optical power and in that the aggregate optical power of the grating and the holographic optical element is substantially less than that of the focusing element whereby the projection system exhibits a substantially achromatic response in a direction substantially perpendicular to the plane of the screen.

By suitably arranging the grating and holographic optical element (HOE), chromatic dispersion perpendicular to the screen (in the z-direction) is minimised.

The invention provides for on-axis (or nearly on-axis) projection and both on- and off-axis viewing while maintaining an achromatic response, typically with little or no chromatic dispersion in any dimension.

Typically the grating and the holographic optical element are made so that if they were assembled together they have no effective optical power. That is to say that on their own they are incapable of forming a viewing zone as a real image. Instead the exit pupil will form as a virtual image on the same side of the grating/HOE combination as the light source or projector that is illuminating them. In the ideal case where the aggregate power is zero the image that is the viewing zone will form at the same distance from the grating/HOE combination as the light source itself. Such a grating/HOE combination will not produce dispersion in the z-direction because the image which is the viewing zone forms at the same distance as the source. But it is clear that such a configuration is useless as a viewing screen without some additional element—this is because the viewing zone must form as a real image—it must form on the opposite side of the screen to the projector. This is achieved by introducing a reflective or refractive optical element with positive optical power. The optical element may conveniently be a Fresnel lens placed in contact with the grating HOE combination, but equally the same effect can be achieved using a conventional lens or a mirror. The lens is chosen such that the lens equation is satisfied as follows:

$$1/f = 1/o + 1/d$$

Where f is the focal length of the lens; o is the distance between the light source or projector and the lens and d is the distance between the lens and the desired location of the viewing zone.

By itself the lens would focus a real image of the source at the same distance from the screen as the desired position of the viewing zone. It will be appreciated that as the grating/HOE combination ideally forms an image of the viewing zone around the position of the light source then when the lens is added to the combination then a real image of the viewing zone image is formed at the correct viewing distance. The lens can be conveniently located either between the projector and the grating/HOE combination or between the grating/HOE combination and the viewing. It may even be incorporated between the grating and HOE, but this is unlikely to be advantageous.

By (a) relying on the HOE/grating combination to form a properly shaped and dispersion compensated viewing zone but without making it from that zone as a real image and (b) using a refractive or reflective optic to provide the optical power needed to form the required real image we achieve the goal of a clearly defined viewing zone formed as a real image with minimal dispersion in any direction.

Typically the screen is formed as a composite element, i.e. the elements of the screen are assembled closely together—preferably bonded together or manufactured as one element. The focusing element (which may comprise a lens or a mirror) may be situated at a distance from the screen but preferably is manufactured as part of the composite screen.

The means for attenuating zero order light may be a fibre optic faceplate, or preferably a louvered screen. Any suitable focusing element may be used, but preferably the focusing element comprises a Fresnel lens.

Preferably the aggregate optical power of the diffraction grating and holographic optical element is approximately zero. "Approximately" in this case indicates that the aggregate optical power is insufficient to cause chromatic dispersion along the z-axis which would cause unacceptable colour fringing of the image projected on the screen under the viewing conditions anticipated in the design specification of the projection system.

Typically the screen is illuminated by one or more light sources (the light from which is typically passed through or reflected from a collimator and/or condenser lens), and the holographic optical element provides one or more viewing zones. Typically the focusing element would focus a real image of the source in the plane where the viewing zone/s is/are located if the other optical elements were not present.

Following is a description of a number of embodiments of the invention with reference to the accompanying Figures, in which:

FIG. 1 is a view of a conventional projection system;

FIG. 2 illustrates a first example of a projection system according to the present invention;

FIG. 2 is an expanded schematic view for convenience of description, the rays shown are examples only. The screen 2 is a composite unit, the illustrated version is the preferred one, though it is possible to alter the order of the elements.

Figure 3:
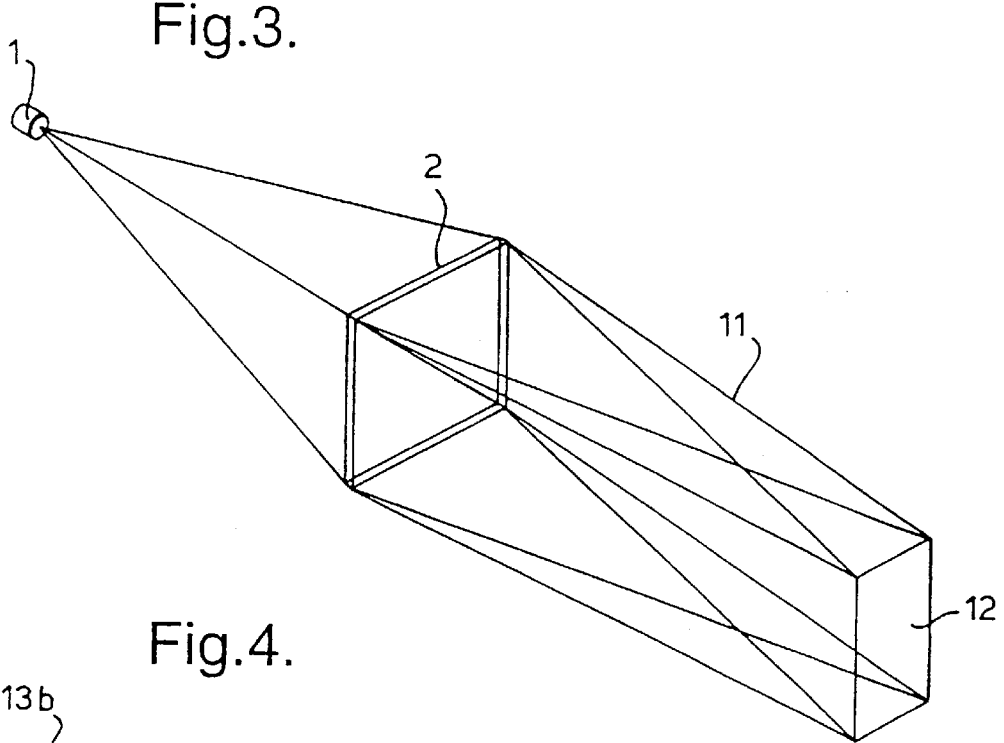
FIG. 3 is a perspective view of the system of FIG. 2, showing a viewing system.

An example ray 7 emanates from source 1 and is incident on the composite screen 2 comprising four elements. The first element illustrated is a focusing element 3, in practice this is likely to be a Fresnel lens. The ray 8 exiting the lens 3 has been bent due to the positive optical power of the lens 3. This ray 8 then strikes the diffraction grating 4, part of the light 9 passes through the grating 4, this is the zero order beam which is then blocked by the louvred screen 5 (such a screen is manufactured by 3M under the name of "Light Control Film" and consists of an array of slanted louvres which only allows light through when the angle of incidence on the screen 5 is within a certain range, all other light being blocked by the louvres). The first order diffracted light 10 exits the grating 4 and passes unblocked through the louvred screen 5, it will be noticed that three rays are illustrated at 10, corresponding to 3 different wavelengths in the incoming light 7 which are chromatically dispersed by the grating 4. These diffracted rays 10 then strike the diffusing Holographic Optical Element (HOE) 6 where they are again bent so as to reconstruct a real image of a diffuse zone, which we will can the "viewing zone" 12 (it could also be referred to as an "exit pupil"). The rays 11 forming this image will of course exit at many different angles, those illustrated are examples only.

Now referring also to FIG. 3. It will be seen that the source 1 illuminates the composite screen 2 which reconstructs the achromatic viewing zone 12. It will be noticed that in contrast to FIG. 1 there is only one such viewing zone—there is no chromatic dispersion in distance from the screen 2. This is achieved by endowing the diffraction grating 4 and the diffusing HOE 6 combination with an aggregate optical power of zero or near zero. The Fresnel lens 3 has positive optical power and in ideal terms it would focus a real image of the source 1 in the plane where the viewing zone 12 is located if the other optical elements 4,5,6 were not present. In practice this design criterion is not very critical and approximation to it is usually sufficient.

It will be appreciated therefore that the position of the viewing zone 12 is dependant on several factors namely:

The position of the source 1 with respect to the screen 2.
The power of the lens 3.
The design of the HOE 6.
The design of the grating 4.

These factors may be exploited in a number of ways.

Figure 4:
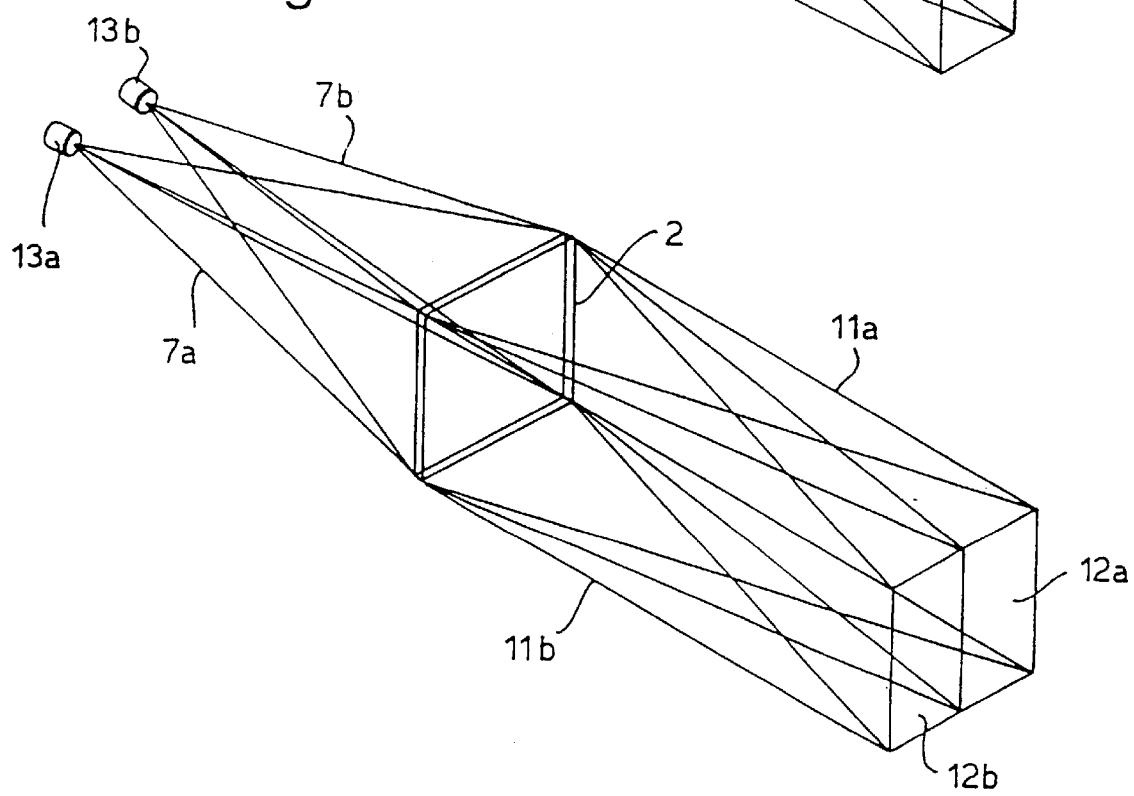
FIG. 4 illustrates a second embodiment of the present invention for a two tone autostereoscopic display.

As our first example a two channel autostereoscopic application is illustrated in FIG. 4.

The source 1 is here replaced by a pair of projectors 13a,13b. These may be of basically conventional type e.g. slide projectors or video projectors. They are arranged to focus the two images of a stereo pair on the composite screen 2. (Projector 13a projects the right image and projector 13b the left image). Some slight "key stone" distortion might occur—especially if the projectors 13 are very close to the screen 2—this is such that it can easily be corrected for by adjusting the angle of the image-bearing device (slide, LCD etc.) within the projectors 13.

As the two projectors illuminate the screen from different positions the corresponding viewing zones 12a,12b also form in different positions.

In the autostereoscopic application a viewer placed such that his or her left eye sees the screen 2 effectively through the zone 12b and the right eye similarly sees the screen through zone 12a. In this case the left eye sees the left eye image projected by projector 13b on screen 2 and the right eye sees the right eye image projected by projector 13a on screen 2. Normal stereopsis will then give the viewer the impression of seeing a 3-D image. The absence of chromatic dispersion in all directions ensures that there is a maximum range of positions whence the stereoscopic image is visible without colour fringing.

The basic arrangement shown in FIG. 4 may be elaborated by adding further projectors 13n thus providing a plurality of images with a corresponding plurality of viewing zones 12n and allowing the viewer to move from one stereo pair to another. Indeed if a large number of projectors are used and the width of the viewing zone 12 correspondingly reduced it is possible to provide a look-around effect where a mobile viewer can move around the screen and look around the composite stereoscopic image thereon projected.

An alternative approach which can achieve a look-around effect may be realised by moving the screen 2 with respect to the projectors 13a,13b. This is achieved either by moving the projectors 13 and simultaneously correcting the images projected by projectors 13 so that the image remains in the same position on the screen 2 or, more conveniently, by translating the screen 2 in its own plane which avoids the need to adjust the images and simply moves the location of the viewing zones 12. The result is the displacement of the viewing zones 12a,12b. so that they track a mobile viewer— it is clearly necessary to track the position of the viewer in this case and to use that information to control the movement of the projectors 13a,13b.In this way a mobile viewer can be provided with a stereoscopic image from a number of positions. It will be appreciated that using this principle a number of capabilities exist namely:

Tracking the viewer in left to right movement and maintaining a stereo viewing condition by moving the viewing zone as described above.

Tracking the viewer in left to right movement and maintaining a stereo viewing condition as described above while updating the images projected so as to project left and right views corresponding to the viewer's position.

Figure 5:
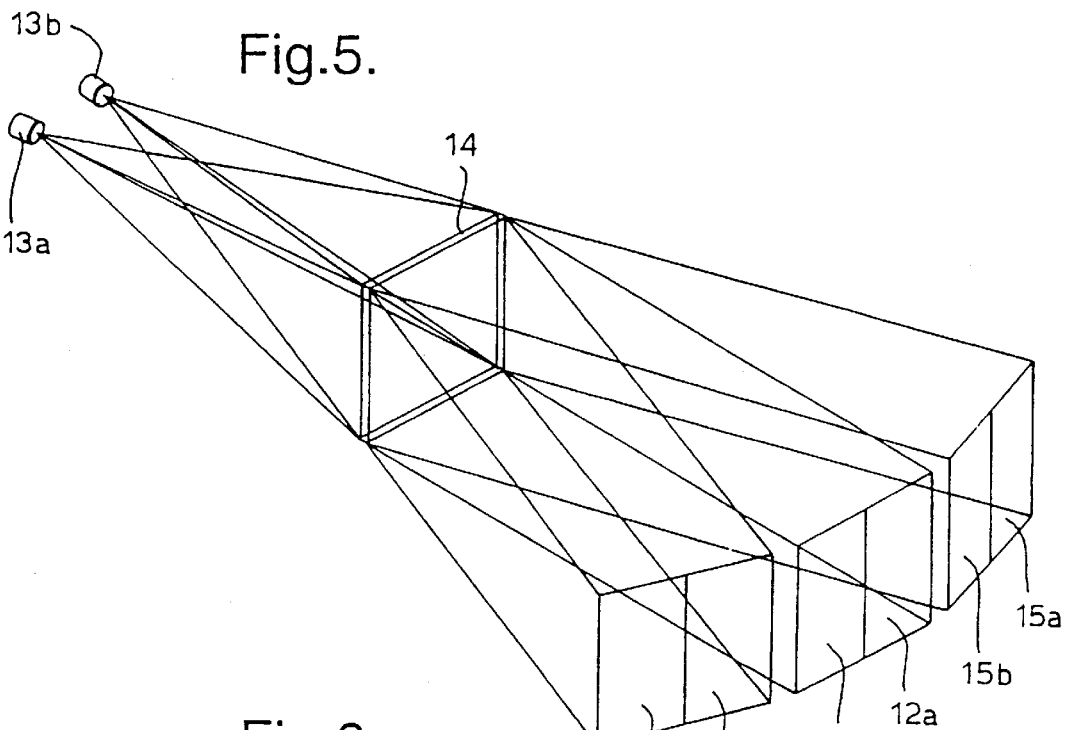
FIG. 5 illustrates a third embodiment of the invention which projects a plurality of pairs of viewing zones; and, FIG. 6 is a fourth embodiment of the present invention in which two distinct, non-stereoscopic views are presented.
Figure 6:
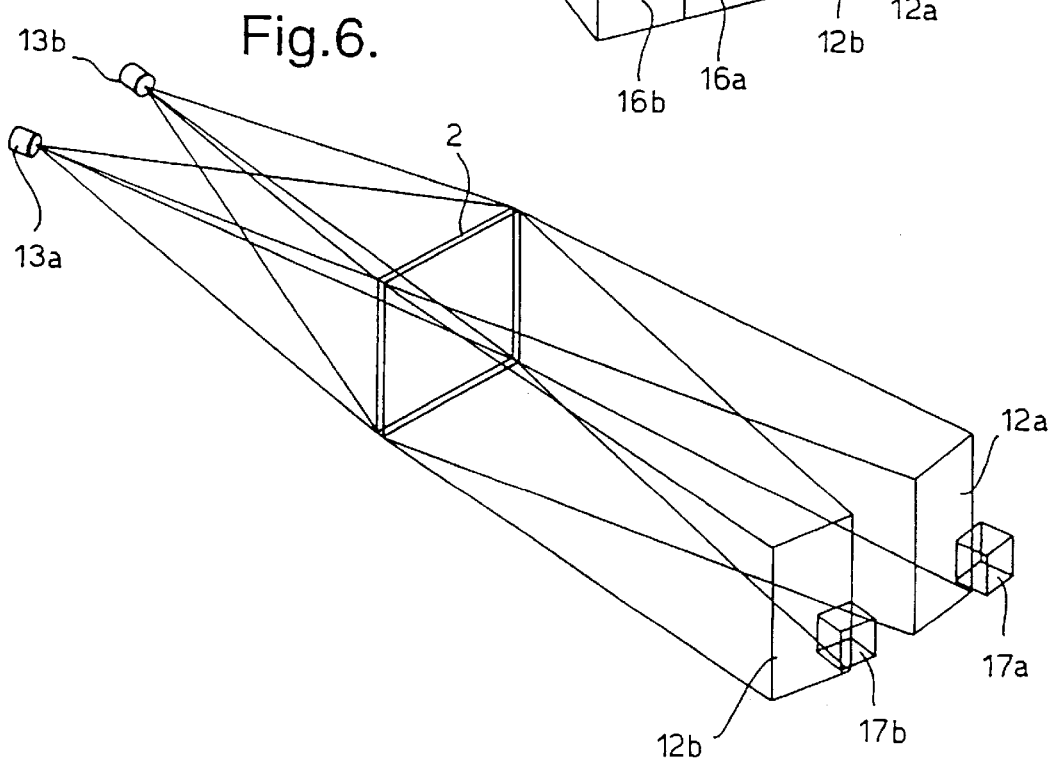

This will provide a look around effect. The distance between the projectors 13 and screen 2 may be altered to allow for different viewing distances. This can be done manually or automatically. In practice such adjustments will mean that the focal length of the projector lenses should be adjusted to compensate for changes in magnification due to the altering of the distance between the projector and screen. Several pairs of projectors 13n,13m may be provided so as to produce stereoscopic viewing for a number of different viewers, in principle the images viewed by each viewer need not be the same, each pair of projectors can be independently controlled as described above. In order to provide similar stereoscopic viewing zones for a number of viewers using just one pair of projectors 13a,13b the diffuse HOE 6 may be recorded with more than one diffuse zone. This is illustrated in FIG. 5:In FIG. 5. screen 14 is identical to screen 2 in all respects except that the HOE 6 has been recorded with three discrete diffuse zones. (The number may be varied and is for example only). Projectors 13a,13b operate as in FIG. 4.and project stereo pair onto screen 14. The screen then provides three distinct stereo viewing zones being 15a plus 15b, 12a plus 12b and 16a plus 16b where the 'a' sections correspond to the right image projected by projector 13a and the 'b' sections correspond to the left image projected by projector 13b. Thus in this case three separate viewers may enjoy the stereo image simultaneously. A second application of the projection system and screen is to present two distinct views (which need not be stereoscopic) according to the viewer's position. This is illustrated in FIG. 6. In this case each projector projects a different image, the image projected by projector 13a may be viewed by observer 17a effectively through the viewing zone 12a, similarly observer 17b will see the image projected by projector 13b.

As a general point it will be appreciated that the grating 4 and HOE 6 may be made in any of the available media available for the production of diffractive optics e.g. silver halide, photopolymer, surface relief, dichromated gelatine. It will also be appreciated that the louvred screen 5 could be a different device such as an array of fibre optics, it must at least strongly attenuate normally incident light and near normally incident light while allowing the diffracted light 10 to pass with significantly lower attenuation.

What is claimed is:

1. A projection system comprising a screen, the screen comprising:
   a diffraction grating for diffracting light into diffracted light which includes zero order attenuating means for receiving the diffracted light from the diffraction grating and for attenuating the zero order light from the diffraction grating to produce attenuated light;
   a diffuse holographic optical element for receiving the attenuated light from the attenuating means and for bending the attenuated light to reconstruct a real image; and
   a focusing system element with positive optical power disposed in an optical path of the light passing through the diffraction grating, the attenuating means and the diffuse holographic optical element wherein the aggregate optical power of the grating and the holographic optical element is less than that of the focusing element whereby the projection system exhibits a minimized chromatic aberration in a direction perpendicular to the plane of the screen.

2. A projection system according to claim 1, wherein the grating and the holographic optical element have an aggregate optical power of approximately zero.

3. A projection system according to claim 1, wherein the holographic optical element provides one viewing zone when the screen is illuminated by one of a source and a projector and wherein the viewing zone forms at or about a distance d from the focusing element where d is such as to satisfy the lens equation:

$$1/f + 1/o + 1/d$$

where f=the focal length of the focusing element and o=the distance of the source or the projector from the focusing element.

4. A projection system according to claim 1, wherein the holographic optical element provides a plurality of viewing zones when the screen is illuminated by one of a source and a projector.

5. A projection system according to claim 3, wherein a plurality of projectors are provided each of which projects an image onto the screen.

6. A projection system according to claim 5 wherein the plurality of projectors project images onto the screen and where the projected images are the component images of a stereoscopic pair.

7. A projection system according to claim 5, wherein the plurality of projectors are mobile (as pairs) and are arranged to project their respective images on the screen with substantially constant image size and without substantial movement of the projected image with respect to the screen.

8. A projection screen according to claim 5, wherein each projector is mobile and responds to the position of a mobile viewer such that the viewer retains a view of one or more images via one or more viewing zones over a range of positions.

9. A projection system according to claim 3, wherein the screen is mobile and responds to the position of a mobile viewer such that the viewer retains a view of one or more images via one or more viewing zones over a range of positions.

10. A projection system according to claim 1, wherein the focusing system element comprises a Fresnel lens.

11. A projection system according to claim 1, wherein the means for attenuating zero order light comprises a louvred screen.

12. A projection system according to claim 1, wherein the screen is a composite element comprising the focusing system element, the means for attenuating zero order light, the diffraction grating and the diffuse holographic optical element.

13. A projection system according to claim 1, wherein the screen further comprises means to illuminate the screen comprising a light source and at least one of a collimator and a condenser lens.

14. A projection system according to claim 2, wherein the holographic optical element provides one viewing zone when the screen is illuminated by one of a source and a projector and wherein the viewing zone forms at or about a distance d from the focusing element where d is such as to satisfy the lens equation:

$$1/f + 1/o + 1/d$$

where f=the focal length of the focusing element and o=the distance of the source or the projector from the focusing element.

15. A projection system according to claim 2, wherein the holographic optical element provides a plurality of viewing zones when the screen is illuminated by one of a source and a projector.

16. A projection system according to claim 4, wherein a plurality of projectors are provided each of which projects an image onto the screen.

17. A projection system according to claim 15, wherein a plurality of projectors are provided each of which projects an image onto the screen.

18. A projection system according to claim 15, wherein a plurality of projectors are provided each of which projects an image onto the screen.

19. A projection system according to claim 16, wherein the plurality of projectors project images onto the screen and where the projected images are the component images of a stereoscopic pair.

* * * * *